Jan. 19, 1932.   J. T. GRIFFIN   1,841,476
METHOD OF FACILITATING THE LOCATION OF MEMBERS SECURED WITHIN BODIES
Filed Dec. 6, 1929
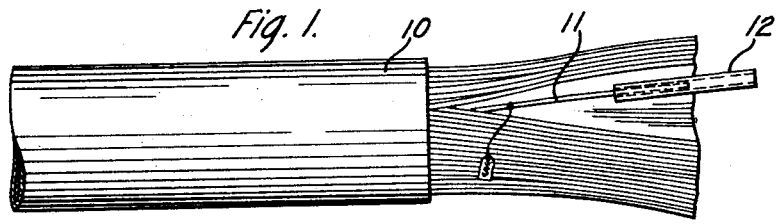
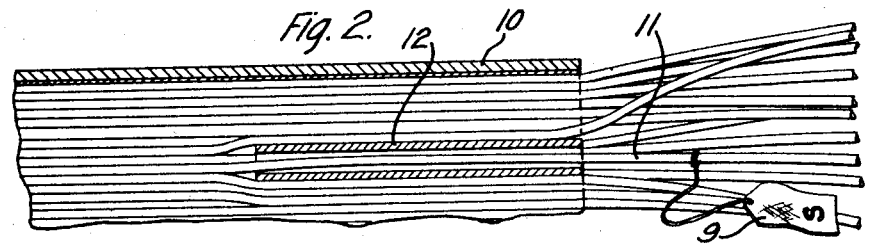
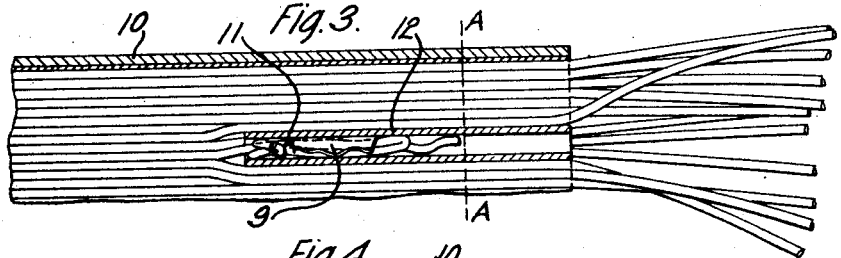
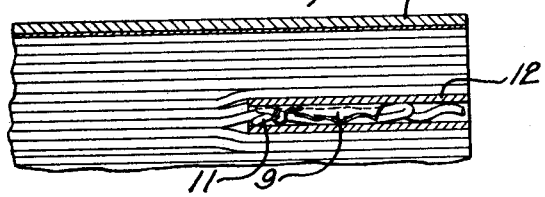
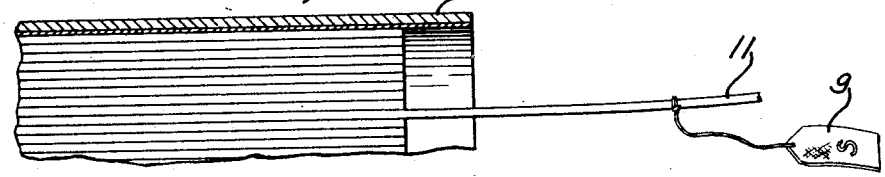
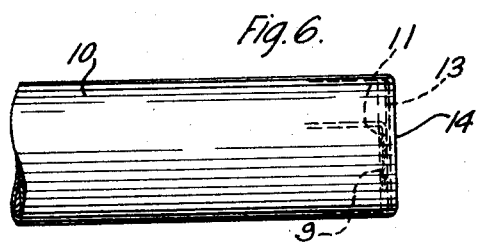
Inventor
James T. Griffin
By H.B. Whitfield Atty.

Patented Jan. 19, 1932

1,841,476

UNITED STATES PATENT OFFICE

JAMES T. GRIFFIN, OF OAK PARK, ILLINOIS, ASSIGNOR TO WESTERN ELECTRIC COMPANY, INCORPORATED, OF NEW YORK, N. Y., A CORPORATION OF NEW YORK

METHOD OF FACILITATING THE LOCATION OF MEMBERS SECURED WITHIN BODIES

Application filed December 6, 1929. Serial No. 412,149.

This invention relates to a method of facilitating the location of a member secured within a body, and more particularly to a method of facilitating the location of defective conductors of a multi-conductor lead sheathed cable.

In the manufacture of multi-conductor lead sheathed telephone cables, it would be impractical to reject or discard the entire cable because one or more of the conductors are defective. The practice heretofore in regard to such defective conductors has been to identify or mark them by attaching a tag to the ends thereof and then forcing or driving these tagged ends within the cable proper so that when the cable is received in the field the installer may identify these conductors. This method, however, has in some instances resulted in severing the tags or has made it difficult to detect such inserted ends.

An object of this invention is to provide an improved, efficient, and expeditious method of facilitating the location of a member secured within a body.

In accordance with this object, the preferred method whereby the invention is practiced as applied to a lead sheathed telephone cable consists in inserting a tube over the end of a tagged, defective conductor and forcing the tube within the sheath of the cable. The tagged end of the conductor is then forced within the inserted tube to a point beyond the place where the cable is to be severed for finishing or sealing its end before shipment, the tagged end thereby remaining intact with the remainder of the conductor and being readily withdrawn with the tube after the cable end is severed. The tagged end so protected during the severing process may then be folded adjacent to the severed ends of the remaining conductors of the cable and the cable end sealed leaving the tagged end exposed when the installer removes the seal.

A full and clear understanding of this preferred method will be readily had from the accompanying drawings illustrating the same, and wherein Fig. 1 is a perspective view of the end of a multi-conductor cable having a defective conductor to be identified by the novel method;

Fig. 2 is a fragmentary sectional view of the cable, showing the tube inserted over the end of the tagged defective conductor and forced within the cable;

Fig. 3 shows the tagged defective conductor end forced within the tube beyond the line A—A where the cable is to be severed for sealing;

Fig. 4 discloses the cable end after severing, leaving the tagged conductor end depressed within the tube and intact with the remainder of the defective conductor;

Fig. 5 discloses the defective conductor end and the tube withdrawn from the cable and the remaining conductor ends as having been depressed within the cable sheath, and Fig. 6 shows the tagged conductor end positioned adjacent the depressed ends of the other conductors and sealed within the cable end, ready for detection by the installer in the field.

Referring now to the drawings wherein like reference numerals designate similar parts throughout the several views, and following the figures through in numerical succession for disclosing the successive steps of the improved method, there is shown a lead sheathed multi-conductor cable end 10 from which projects a plurality of twisted pairs of conductors one of which is a tagged defective conductor 11 which it is desired to identify by means of the method practiced by this invention. It will be understood that the conductor 11 may be defective either due to a break or a short circuit with some other conductor, or for any other reason, and that the tag will indicate the nature of the defect, in this case an "S" tag being shown attached thereto for designating that the conductor 11 is short circuited. For the purpose of identification, there is inserted over the end of the defective tagged conductor 11, a tube or slender cylinder 12, preferably of lead or other easily severable material, although a fiber cylinder may also be used. The tube 12 is forced over the tag 9 of the conductor 11 and within the cable sheath, as shown in Fig. 2, and the tagged end 11 is next inserted within the tube 12 to a point beyond the line A—A of Fig. 3 where the cable is to be severed for sealing purposes. The cable is then severed as shown in Fig. 4, along the line A—A, leaving the tagged end 11 protected from the severing process and still intact with the remainder of the conductor 11. Then, as shown in Fig. 5, the tube 12 and the tagged end 11 are withdrawn from the cable, and the tube is removed from the conductor end 11, leaving the conductor end extending beyond the sheath to a convenient length.

The ends of the remaining conductors, as shown in Fig. 5, are then depressed or forced within the cable sheath to enable the conductor end 11 to be later placed within the sheath and to permit turning the end of the sheath inwardly, as clearly shown in Fig. 6. The conductor end 11 is laid over the ends of these depressed conductors and suitable packing material or a washer 13 is inserted thereover. The sheath of the cable is then turned inwardly, and solder or sealing material 14 is applied to the end of the cable after the exposed surface of the lead sheath is cleaned by scraping, thus leaving the tagged end 11 of the defective conductor immediately adjacent the seal and readily accessible to the installer, who removes the sealed end. If two adjacent conductors are defective, the ends of both conductors may be placed within a single tube 12, the procedure in other respects being the same as that above described. It will be apparent that this method enables the installer in the field to readily detect the marked conductor or conductors without making an extended search to find such conductors, and without having to first test the cable to determine which conductors are defective. It is therefore believed to be manifest that the improved method herein disclosed provides an efficient and expeditious way of identifying conductors in accordance with the object of the invention.

It will, of course, be understood that the invention is not to be limited by the specific embodiment above described, but is to be limited only by the scope of the appended claims.

What is claimed is:

1. A method of facilitating the location of a member secured within a body, consisting in positioning an element over a portion of the member, forcing the element into the body, and partially inserting the member within the element.

2. A method of facilitating the location of a member secured within a body to be severed, consisting in positioning an element over a portion of the member, forcing the element into the body, and inserting a portion of the member into the element to a point beyond the line of severing.

3. A method of facilitating the location of a conductor of a multi-conductor cable to be severed, consisting in positioning a tube over the end of the conductor, forcing the tube into the cable, and inserting the end of the conductor into the tube to a point beyond the line of severing.

4. A method of facilitating the location of a conductor of a multi-conductor cable to be severed, consisting in marking the end of the conductor, positioning a tube over the marked end, forcing the tube into the cable, and inserting the marked end of the conductor into the tube to a position beyond the line of severing to preserve it intact during the severing process.

5. A method of facilitating the location of a conductor of a multi-conductor cable to be severed, consisting in positioning a cylindrical member over the end of the conductor to be identified, inserting the tube into the body of the cable, and inserting said end into the tube to a position beyond the line of severing.

6. A method of facilitating the location of a member secured within a body to be severed, consisting in positioning a tube over an end of the member, forcing the tube along the member and within the body, inserting said end of the member within the tube to a point beyond the line of severing, and withdrawing said end of the member and the tube from the body after the severing process.

7. A method of facilitating the location of a member secured within a body to be severed, consisting in positioning a tube over an end of the member, forcing the tube along the member and within the body, inserting said end of the member within the tube to a point beyond the line of severing, withdrawing said end of the member and the tube from the body after the severing process, positioning said withdrawn end adjacent the severed body, and sealing it therein.

8. A method of facilitating the location of a plurality of defective conductors of a multi-conductor cable, the end of which is to be severed and with their ends tagged, consisting in positioning a tube over the tagged ends, forcing the tube within the end of the cable, inserting the tagged ends within the tube to a point beyond the line of severing, withdrawing the tube and tagged ends after the severing process, positioning the withdrawn tagged ends within the severed end of the cable, and sealing the tagged ends therein.

In witness whereof, I hereunto subscribe my name this 27th day of November, A. D 1929.

JAMES T. GRIFFIN